W. L. & I. D. FIFIELD.
APPARATUS FOR BABBITTING CONNECTING RODS.
APPLICATION FILED APR. 13, 1914.
1,121,342.
Patented Dec. 15, 1914.
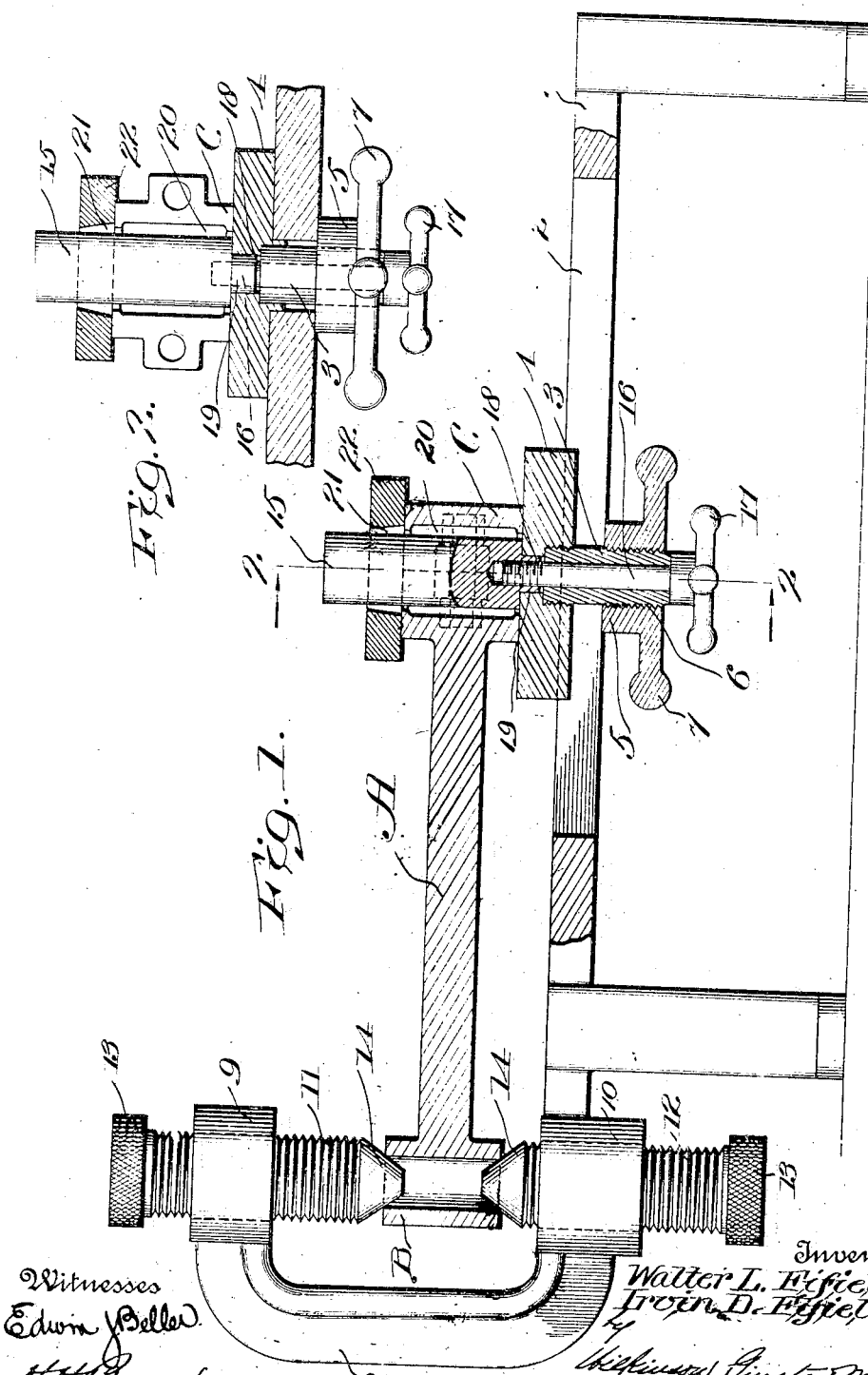

UNITED STATES PATENT OFFICE.

WALTER L. FIFIELD AND IRVIN D. FIFIELD, OF AUGUSTA, MAINE.

APPARATUS FOR BABBITTING CONNECTING-RODS.

1,121,342.

Specification of Letters Patent.  Patented Dec. 15, 1914.

Application filed April 13, 1914. Serial No. 831,589.

*To all whom it may concern:*

Be it known that we, WALTER L. FIFIELD and IRVIN D. FIFIELD, citizens of the United States, residing at Augusta, in the county of Kennebec and State of Maine, have invented certain new and useful Improvements in Apparatus for Babbitting Connecting-Rods; and we do hereby declare the following to be a full, clear, and exact description of the invention, such as will enable others skilled in the art to which it appertains to make and use the same.

The present invention relates to apparatus for applying Babbitt metal to engine connecting rods, and has for its purpose to provide a construction which is adaptable for babbitting the eyes of the rods without requiring the usual subsequent boring for finishing; and which is adjustable for accommodating connecting rods of different lengths.

A further purpose of the invention is to provide an apparatus of the type in question with means for securing and centering the connecting rod through the eye at one end, whereby to position and true the eye to be babbitted regardless of its condition due to wearing; and one in which the babbitt shaping arbor for the eye is selectable in accordance with the size of shaft of the connecting rod.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views. Figure 1 is a side elevational view, with parts in section, of the apparatus and showing the connecting rod in position for babbitting. Fig. 2 is a transverse sectional view thereof taken on the line 2—2 and looking in the direction of the arrows.

Referring to the construction in detail, the apparatus consists of a suitable support providing a bed-plate 1, which is slotted longitudinally, as at 2, to receive the tubular piece 3 fitting within and carrying the sliding arbor block 4, and which is adjustable laterally of the bed-plate to accommodate the length of the connecting rod A to be babbitted. A clamping nut 5 is screwed on the threaded end 6 of the member 3, and is provided with hand gripping projections or arms 7, for manually tightening the nut 5 to secure the arbor block in set position.

A yoke 8 is mounted on the bed-plate 1 at one end of the frame, and has a pair of screw-threaded eyes 9 and 10 receiving the screw bolts 11 and 12, respectively, which bolts are formed with milled heads 13 for adjusting. The adjacent ends 14 of the bolts 11 and 12 are of conical shape to engage within the eye B of the connecting rod A to center and secure the same. The eye C to be babbitted rests on the arbor block 4, and is held with its walls perpendicular or true to receive the babbitting metal, regardless of the amount or extent of irregular wearing.

A babbitting arbor or core piece 15 passes through the eye C, and is detachably secured to the arbor block 4 by a screw-threaded shaft 16 having a hand-turning head or nut 17; and an annular projection or collar 18 formed on said arbor block 15 fits within a complementary formed aperture 19 of the arbor block and serves to additionally hold said core piece 15 true with respect to the arbor block and the eye piece C. The arbor block 15 is rigidly secured centrally within the eye piece C and forms an annular space 20 with the inner walls thereof to receive the babbitting metal which is poured in through a suitable opening 21 formed in a collar 22 that rests upon said eye piece, as in the manner shown in the drawing.

The core piece 15 may be selected in accordance with the size of shaft on which the connecting rod will be mounted. It will be readily seen from the foregoing that, since the connecting rod may be adjusted and centered to a degree of great precision, the babbitting arbor will reproduce an opening in exact accordance with the shaft to be used, and that the babbitting will be true without requiring further finishing.

It is obvious that those skilled in the art may vary the details of construction and arrangement of parts without departing from the spirit of our invention, and therefore we do not wish to be limited to such features except as may be required by the claims.

We claim:

1. In an apparatus for babbitting connecting rods the combination of a supporting structure; adjustable means mounted on said structure for securing, and centering at one end, the piece to be babbitted; a device for supporting the free end of said piece; and a member mounted on said supporting device providing a core within the free end of said piece, and forming therewith a space to receive babbitt metal, substantially as described.

2. In an apparatus for babbitting connecting rods the combination of a supporting structure; adjustable means mounted on said structure for securing, and centering at one end, the piece to be babbitted; a device for supporting the free end of said piece; a member mounted on said supporting device providing a core within the free end of said piece, and forming therewith a space to receive Babbitt metal; and a collar mounted on said free end surrounding said core piece and provided with an opening to receive the poured Babbitt metal, substantially as described.

3. In an apparatus for babbitting connecting rods the combination of a supporting structure; a device mounted on said structure for securing and centering the connecting rod through one eye thereof; a device for supporting the free end of the connecting rod; a core detachably secured to said supporting device and passing through the eye at the free end of the connecting rod, and forming therewith a space to receive the Babbitt metal; and a collar mounted on the free end of the connecting rod and provided with an opening to receive the poured Babbitt metal, substantially as described.

4. In an apparatus for babbitting connecting rods the combination of a supporting structure; a device mounted on said structure for securing and centering the connecting rod through one eye thereof; a device mounted to have lateral adjustment on said supporting structure and adapted to support the free end of the connecting rod; a core detachably secured to said supporting device and passing through the eye at the free end of the connecting rod, and forming therewith a space to receive the Babbitt metal; and a collar mounted on the free end of the connecting rod and provided with an opening to receive the poured Babbitt metal, substantially as described.

5. In an apparatus for babbitting connecting rods the combination of a supporting structure; a pair of conical ended screws mounted on said structure adapted to secure and center the connecting rod through one eye thereof; and means for supporting the free end of the connecting rod and applying the Babbitt metal to the eye thereof, substantially as described.

6. In an apparatus for babbitting connecting rods the combination of a supporting structure; a device mounted on said structure adapted to secure and center the connecting rod through one eye thereof; an arbor block slidably adjustable on said supporting structure, and adapted to support the free end of the connecting rod; a babbitting arbor detachably mounted on said arbor block and centered within the eye at said free end of the connecting rod, and forming therewith an annular space adapted to receive Babbitt metal; and a collar removably mounted on said free end eye and provided with an opening to receive the poured Babbitt metal, substantially as described.

In testimony whereof, we affix our signatures, in presence of two witnesses.

WALTER L. FIFIELD,
IRVIN D. FIFIELD.

Witnesses:
L. J. COLEMAN,
R. S. BUZZELL.